United States Patent
Hegde (10) Patent No.: US 10,477,429 B2
(45) Date of Patent: Nov. 12, 2019

(54) REDUCING LATENCY IN WIRELESS NETWORKS

(71) Applicant: MICROSOFT TECHNOLOGY LICENSING, LLC, Redmond, WA (US)

(72) Inventor: Uday S Hegde, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/881,798

(22) Filed: Jan. 28, 2018

(65) Prior Publication Data

US 2019/0239110 A1   Aug. 1, 2019

(51) Int. Cl.

| | |
|---|---|
| *H04W 48/16* | (2009.01) |
| *H04W 48/04* | (2009.01) |
| *H04W 48/10* | (2009.01) |
| *H04W 28/02* | (2009.01) |
| *H04W 64/00* | (2009.01) |
| *H04M 1/725* | (2006.01) |
| *H04W 84/12* | (2009.01) |

(52) U.S. Cl.
CPC ....... *H04W 28/0236* (2013.01); *H04W 48/16* (2013.01); *H04W 64/006* (2013.01); *H04M 1/7253* (2013.01); *H04W 48/04* (2013.01); *H04W 48/10* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 8,654,732 | B2 | 2/2014 | Melkote et al. |
| 2005/0180367 | A1 | 8/2005 | Dooley et al. |
| 2008/0014934 | A1* | 1/2008 | Balasubramanian ........ H04W 48/16 455/434 |
| 2008/0112373 | A1 | 5/2008 | Shpak |
| 2013/0044735 | A1* | 2/2013 | Lee ........ H04W 84/12 370/336 |
| 2016/0066247 | A1 | 3/2016 | Villasenor |
| 2017/0086251 | A1 | 3/2017 | Valliappan et al. |

(Continued)

FOREIGN PATENT DOCUMENTS

CN    101588345 A    11/2009

OTHER PUBLICATIONS

"International Search Report and Written Opinion Issued in PCT Application No. PCT/US19/012007", dated Apr. 12, 2019, 10 Pages.

(Continued)

*Primary Examiner* — Anh Ngoc M Nguyen (57) ABSTRACT

Techniques for reducing latency between terminal stations in a wireless local area network. In an aspect, two stations in close proximity may be configured to associate with a common access point, by causing one or more of the stations to disassociate from a current access point and reassociating with the common access point. The identity of the common access point may be independently derived at each terminal station using simple broadcast messaging procedures, without the need for extensive communications or handshaking between the stations. In an alternative aspect, a terminal station may repeat the disassociation and reassociation procedures without knowledge of the other station's BSSID, until a measured latency drops below a threshold.

20 Claims, 10 Drawing Sheets

(56) References Cited

U.S. PATENT DOCUMENTS

2017/0257344 A1 9/2017 Huang et al.
2017/0311249 A1 10/2017 Lopes et al.
2017/0347388 A1* 11/2017 Cai .................. H04W 72/0493
2017/0359300 A1 12/2017 Patil et al.

OTHER PUBLICATIONS

Chen, et al., "Mixed-Mode WLAN: The Integration of Ad Hoc Mode with Wireless LAN Infrastructure", In Journal of IEEE Conference on Global Telecommunications, vol. 1, Dec. 1, 2003, pp. 231-235.

* cited by examiner

REDUCING LATENCY IN WIRELESS NETWORKS

BACKGROUND

A wireless local area network (herein "WLAN") is a network in which two or more terminal stations (herein "STA's") wirelessly communicate with each other over a spatially limited area. The IEEE 802.11 Wireless Local Area Network Specifications (herein "802.11") define a set of protocols for communications between devices in a WLAN. In a mode of operation known as infrastructure mode, a single WLAN includes one or more access points (AP's) acting as hubs for the network. Terminal stations (herein "STA's") may each access the WLAN by communicating with one of the AP's.

Certain WLAN applications call for two or more STA's connected to a single WLAN to exchange data with each other through the wireless infrastructure, i.e., through one or more AP's. For example, a smartphone may be connected to a wireless display over a WLAN to display content from the smartphone on a larger screen. In this scenario, there will be a latency in communications between the wireless display and the smartphone, due to the time required for the data to travel over the WLAN infrastructure.

It would be desirable to provide simple and efficient techniques to reduce latency in communications between terminal stations in WLAN's operating in infrastructure mode.

DETAILED DESCRIPTION

Various aspects of the technology described herein are generally directed towards techniques for reducing latency in communications between terminal stations in a wireless local area network. In an aspect, two stations in close proximity may be configured to associate with a common access point, by causing one or more of the stations to disassociate from a current access point and to reassociate with the common access point. In an aspect, the identity of the common access point may be independently derived at each terminal station using simple broadcast messaging procedures, without the need for extensive communications or handshaking between the terminal stations. In an alternative aspect, the identity of the common AP need not be known a priori, and a terminal station may repeat the disassociation and reassociation procedures until a measured latency with a paired terminal station drops below a maximum latency threshold.

The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

Figure 1:
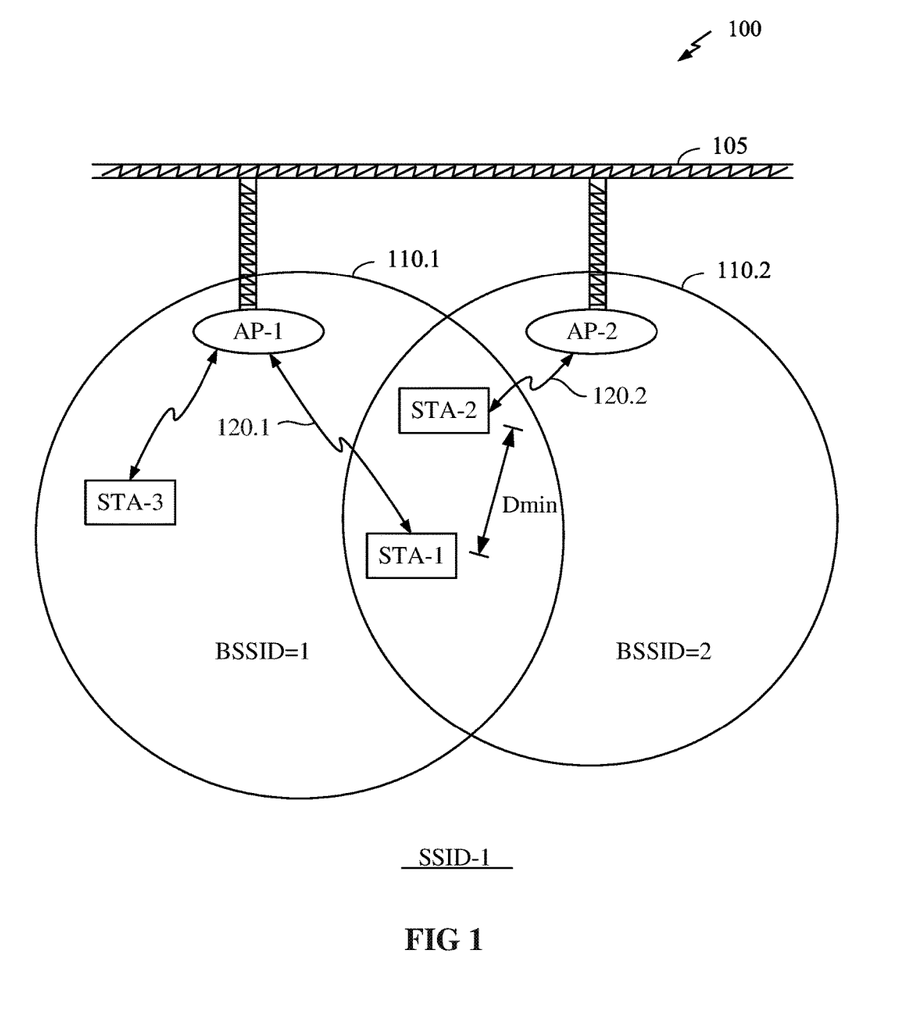
FIG. 1 shows a wireless local area network illustrating various aspects of the present disclosure.

FIG. 1 shows an illustrative configuration 100 of a wireless local area network (herein "WLAN") illustrating various aspects of the present disclosure. Note FIG. 1 is not meant to limit the scope of the present disclosure to any particular network types, topologies, numbers of access points or stations, etc.

In FIG. 1, the WLAN may service a plurality of wireless devices or terminal stations (herein "STA's") within its coverage area. In exemplary implementations, an STA may correspond to any wireless device, e.g., mobile wireless devices such as smartphones or laptop computers, or other wireless devices such as desktop computers, wireless displays, etc.

The WLAN has a network name or service set identifier (herein "SSID"), illustratively denoted SSID-1. In an exemplary implementation, an SSID may be defined as according to the IEEE 802.11 Wireless Local Area Network Specifications (herein "802.11"), also known as "Wi-Fi." While certain exemplary instances of a WLAN are described herein with reference to 802.11, it will be appreciated that techniques of the present disclosure are readily applicable to other wireless standards or specifications, and such alternative exemplary implementations are contemplated to be within the scope of the present disclosure.

For ease of illustration, only one WLAN is shown in FIG. 1, while, generally, a single STA may be within the coverage area of multiple WLAN's. Of such WLAN's, an STA may be configured to access only authorized or trusted networks or SSID's, e.g., using authentication and/or encryption keys where necessary.

In a mode of WLAN operation known as "infrastructure mode," the WLAN may include a plurality of servers or access points (herein "AP's"), such as AP-1 and AP-2 shown in FIG. 1. In an exemplary implementation, an AP may correspond to a wireless router configured to provide wireless service to STA's located within the AP's spatial coverage area. For example, in FIG. 1, STA-1 is coupled by wireless connection 120.1 to AP-1, and STA-2 is coupled by wireless connection 120.2 to AP-2.

AP-1 and AP-2 are coupled to each other using a wired or wireless connection 105, which may correspond to, e.g., a wired or cabled local area network (herein "LAN") connection. Connection 105 may further be coupled to a wide area network (herein "WAN"), e.g., enabling access to the Internet by all members of the WLAN.

An AP and any STA's serviced by that AP collectively constitute a logical entity known as a basic service set (herein "BSS"), and each BSS may have a unique identifier known as a basic service set identifier (herein "BSSID"). For example, in FIG. 1, AP-1, STA-1 and STA-3 are associated with BSSID=1, while AP-2 and STA-2 are associated with BSSID=2. Note all STA's in FIG. 1 are associated with a single SSID (e.g., SSID-1), and hence are denoted intra-network STA's herein.

It will be appreciated that the infrastructure mode of operation advantageously enables seamless connectivity, such that a mobile STA may be sequentially serviced by different AP's while staying connected to the same SSID. For example, in FIG. 1, STA-1 is shown as being serviced by AP-1 through wireless connection 120.1. However, if STA-1 moves outside the range 110.1 of AP-1, while staying in range 110.2 of AP-2, then STA-1 may "disassociate" from AP-1 and subsequently "reassociate" with AP-2. The process of disassociation and reassociation may proceed as defined in 802.11, e.g., by invoking disassociation and reassociation services in the distribution system service (DSS).

In certain applications, any two intra-network STA's (herein "paired STA's"), illustratively denoted STA-1 and STA-2 in FIG. 1, may wirelessly communicate with each other in infrastructure mode according to a procedure such as procedure 200 in FIG. 2, described hereinbelow. Note procedure 200 is shown for illustrative purposes only, and is not meant to limit the scope of the present disclosure to any particular types of connections between paired STA's and AP's of the network.

Figure 2:
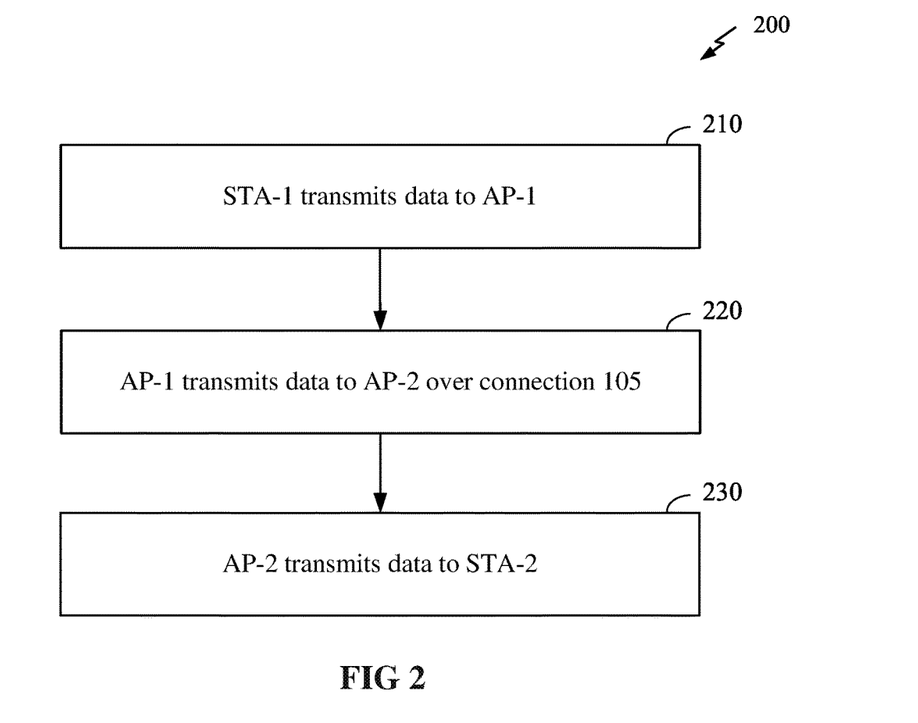
FIG. 2 shows a procedure wherein any two intra-network STA's may wireless communicate with each other in infrastructure mode.

In FIG. 2, at block 210, STA-1 wirelessly transmits data to AP-1, with which it is associated. At block 220, AP-1 transmits the data received from STA-1 to AP-2, e.g., over connection 105. At block 230, AP-2 wirelessly transmits the data to STA-2, which is associated with AP-2. It will be appreciated that network traffic in the opposite direction, e.g., from STA-2 to STA-1, may be analogously conducted.

From FIGS. 1 and 2, it will be appreciated that the relaying of data between AP-1 and AP-2 at block 220 introduces a latency to wireless communications between paired STA's STA-1 and STA-2, even if STA-1 and STA-2 are in close physical proximity to each other. This latency may critically degrade performance for certain types of audio and/or video streaming systems, wherein data transfers are heavy and need to have low latency. For example, such systems may include wireless display applications implemented according to the Miracast standard, wherein a Miracast source (e.g., STA-1) is paired with a Miracast sink (e.g., STA-2).

It would be desirable to provide techniques to minimize latency when wirelessly transferring data between paired intra-network STA's in WLAN infrastructure mode.

Figure 3:
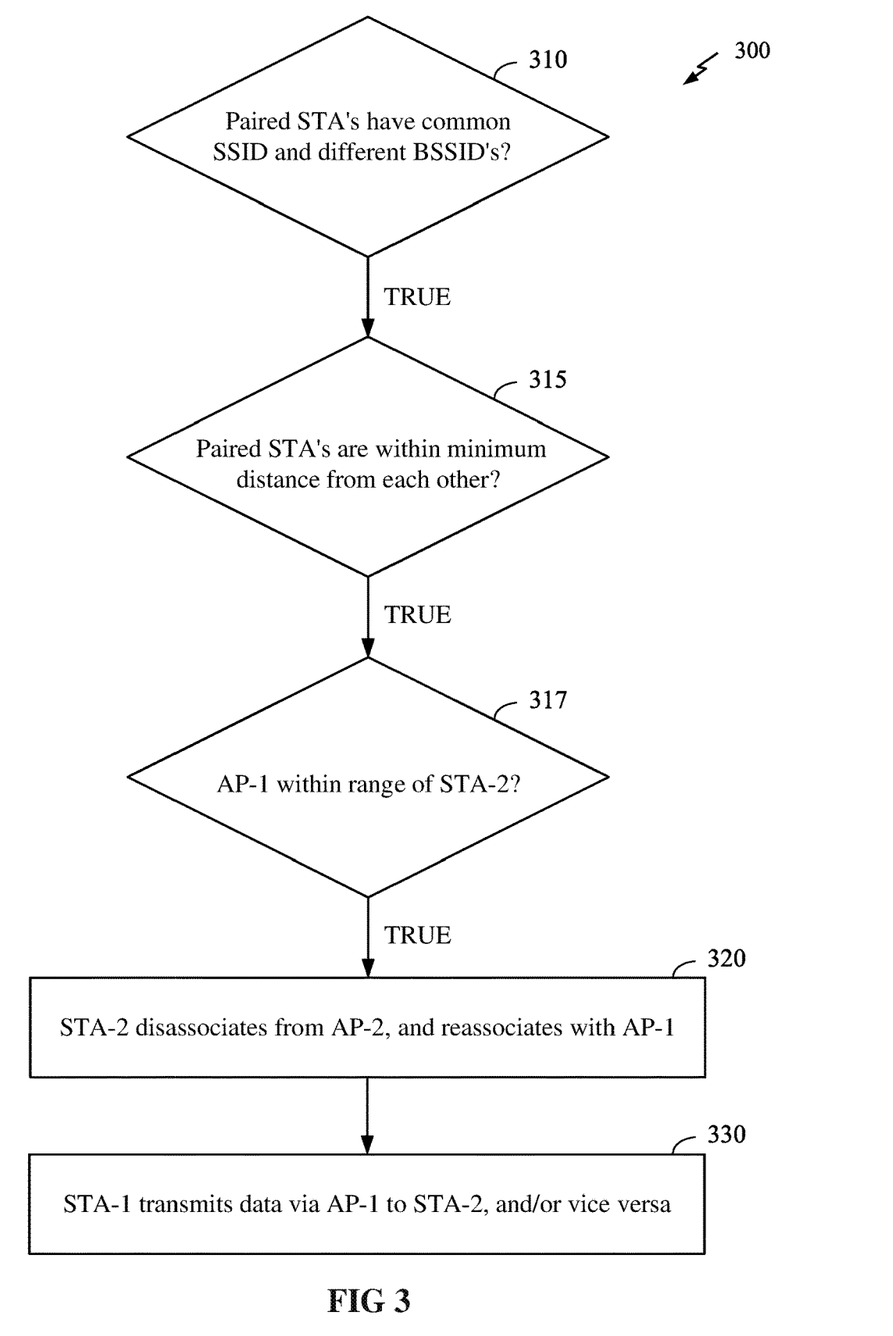
FIG. 3 illustrates an exemplary implementation of a method according to the present disclosure.
Figure 4:
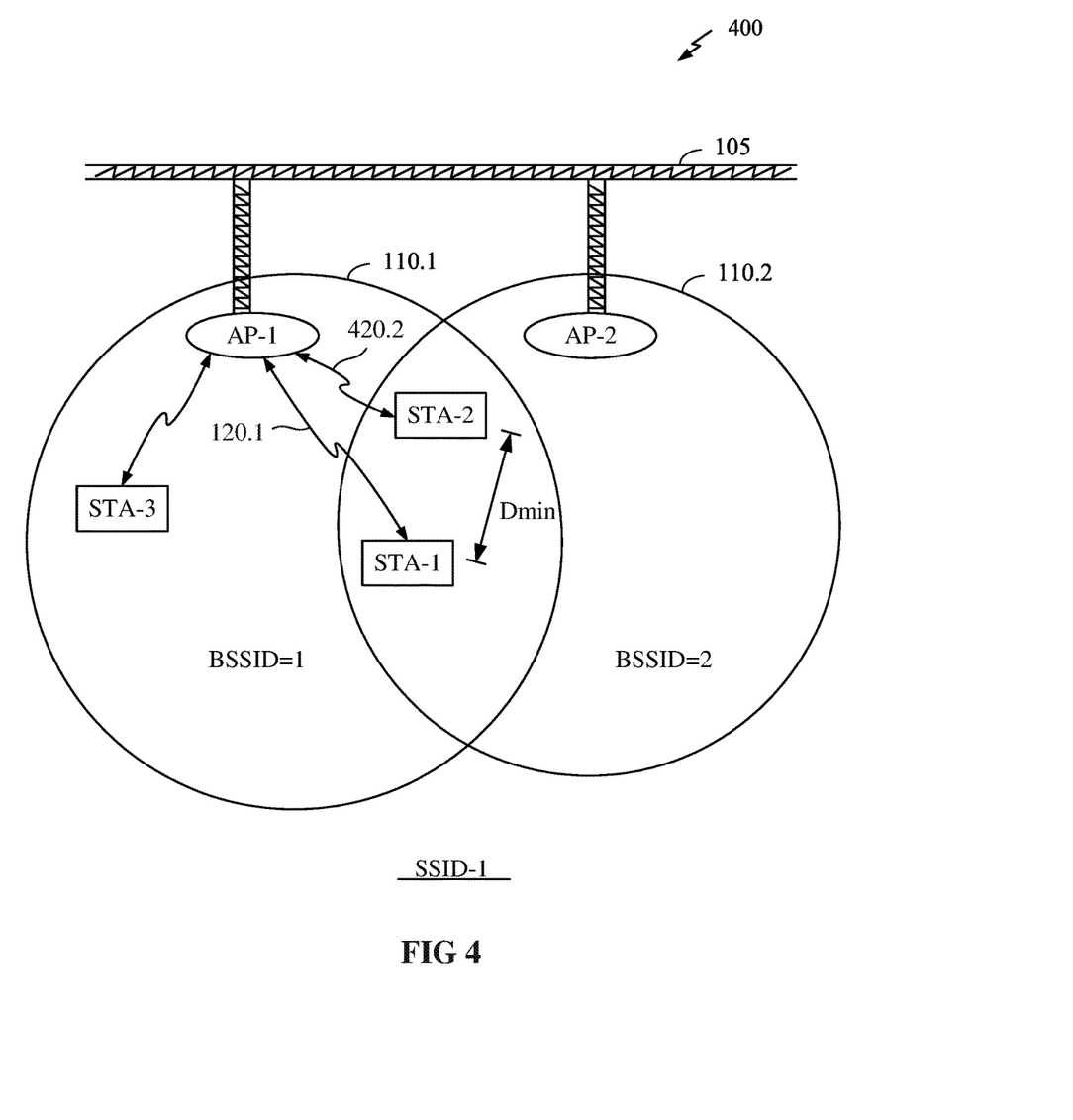
FIG. 4 shows an exemplary stage during the connection procedure of the method in FIG. 3.

FIG. 3 illustrates an exemplary implementation of a method 300 according to the present disclosure, and FIG. 4 shows an exemplary configuration 400 during the connection procedure of method 300. Note FIGS. 3 and 4 are shown for illustrative purposes only, and are not meant to limit the scope of the present disclosure. For example, the figures are not meant to limit the number of SSID's, AP's, STA's, or BSS's present in any system wherein the present techniques are implemented.

In FIG. 3, at block 310, for paired STA's (e.g., STA-1 and STA-2), it is determined whether they share a common SSID but have different BSSID's. For example, this may correspond to a scenario such as illustrated in FIG. 1, wherein STA-1 and STA-2 are both associated with SSID-1, but STA-1 is associated with BSSID=1, and STA-2 is associated with BSSID=2. If the determination is TRUE, then method 300 proceeds to block 315.

In an exemplary implementation, the determination at block 310 may be performed in a decentralized, peer-to-peer manner at each STA, e.g., without requiring a third entity other than the paired STA's. For example, paired STA's may wirelessly broadcast their SSID's/BSSID's to each other (and any other intra-network STA's within range) via point-to-point communications, e.g., without passing data through their AP's. In an alternative exemplary implementation, either or both STA's may broadcast its information to other intra-network STA's, e.g., by employing a higher-layer broadcast procedure in which an STA wirelessly transmits its BSSID to its AP, which in turn relays the information to other intra-network STA's, etc. In yet another exemplary implementation, e.g., as illustrated and described with reference to FIG. 12 hereinbelow, neither STA needs to know the BSSID of the other STA prior to performing the disassociation and reassociation procedures described hereinbelow.

At block 315, it is determined whether the paired STA's are within a minimum distance (Dmin) of each other. In an exemplary implementation, each STA may utilize a local device geolocation (e.g., GPS or global positioning system) module to determine its own current spatial position, and communicate its position to the other STA, e.g., using the peer-to-peer communication techniques described hereinabove with reference to block 310. In an alternative exemplary implementation, the determination at block 315 may also be performed by each STA measuring the received signal strength of the other STA of the pair, and using the received signal strength as a proxy for the distance between the two STA's.

It will be appreciated that in alternative exemplary implementations, blocks 310, 315 may be reversed in sequence, or executed in parallel, etc.

At block 317, one of the paired STA's checks whether it is in range of the AP associated with the other STA. For example, STA-2 may broadcast an 802.11 probe request to solicit responses from access points within range of the wireless client. It will be appreciated that, given the determination that STA-1 and STA-2 are within a minimum distance of each other as determined at block 315, the probability of AP-1 being in range of STA-2 is high.

At block 320, STA-2 disassociates from AP-2. For example, STA-2 may issue 802.11 disassociation frames to AP-2 to initiate the process of disassociation. Further at block 320, the disassociated STA subsequently reassociates with AP-1. Following reassociation, both STA-1 and STA-2 are associated with AP-1, also denoted herein the "common AP."

FIG. 4 shows an exemplary configuration 400 of the WLAN following execution of block 320. In particular, STA-2, having disassociated from AP-2, reassociates with AP-1, the common AP, via wireless connection 420.2. Subsequent to block 320, both STA-1 and STA-2 share a common BSSID.

Note STA-2 specifically disassociates from AP-2 at block 320, even though STA-2 may still be within range of AP-2, and/or even if AP-2 in fact affords the strongest wireless signal to STA-2 at the time. This may contrast with typical disassociation/reassociation procedures, e.g., such as may be performed in response to an STA moving out of range of an AP with which it is currently associated. In an exemplary implementation of the present disclosure, STA-2 may further be configured to prevent reassociation with AP-2 during execution of method 300, even if AP-2 is within range.

At block 330, STA-1 transmits data via AP-1 to STA-2. STA-2 may also or alternatively transmit data via AP-1 to STA-1. As there is no longer inter-AP data transmission as per block 220 of procedure 200, it will be appreciated that the latency accompanying such inter-AP transmission is advantageously eliminated.

To implement method 300, it will be appreciated that the paired STA's should be within range of a common AP, e.g., AP-1 in FIG. 4. In alternative exemplary implementations, the aforementioned techniques may also be applied if neither STA is presently connected to the common AP, and/or when the paired STA's are separated by more than the minimum distance Dmin, as described hereinbelow.

Figure 5:
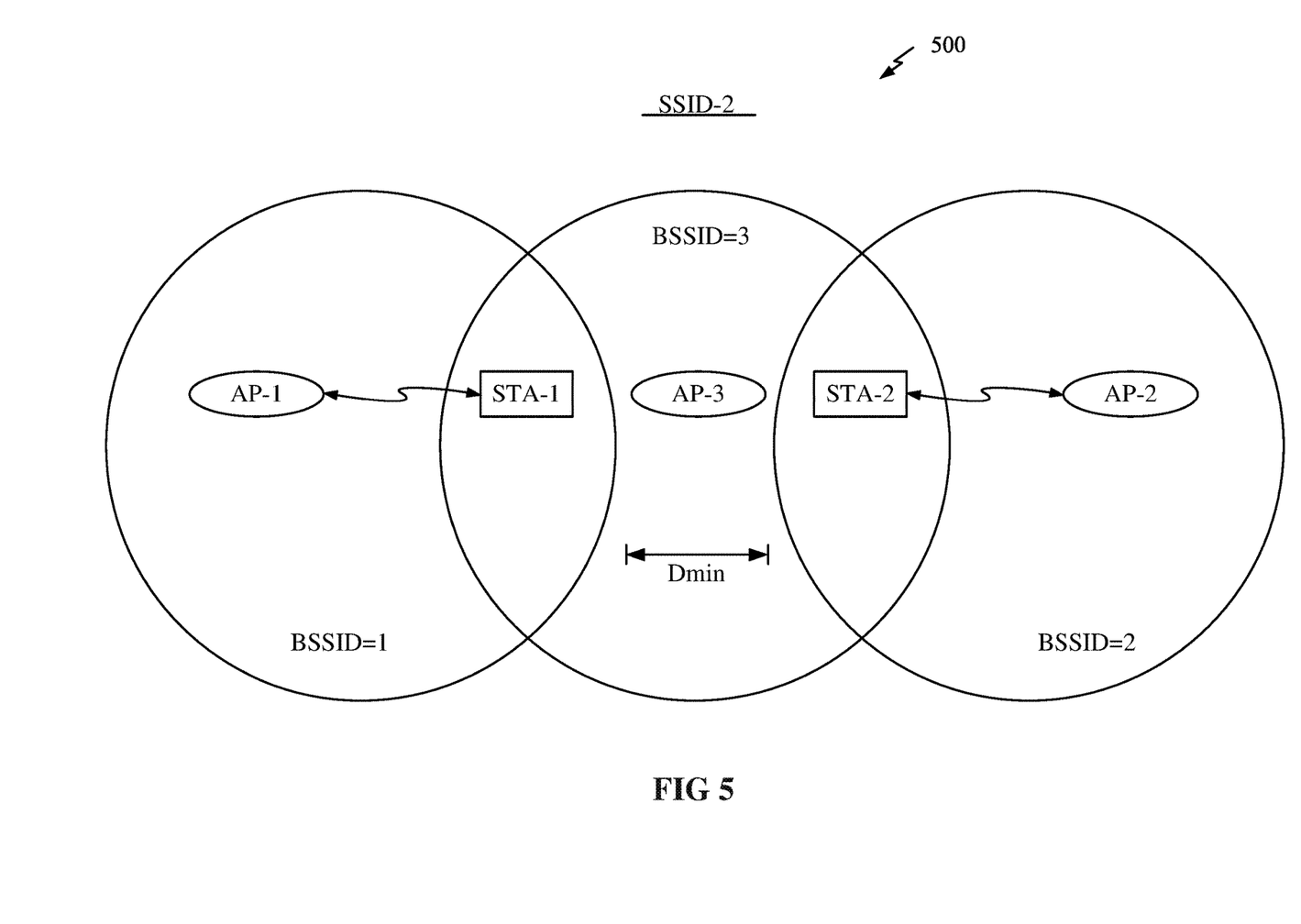
FIG. 5 illustrates an alternative initial WLAN configuration.

FIG. 5 illustrates an alternative initial WLAN configuration 500, with paired STA's STA-1 and STA-2 associated with SSID-2. In FIG. 5, STA-1 is associated with AP-1, and STA-2 with AP-2. However, neither AP-1 nor AP-2 is suitable for use as a common AP, since each is out of range of either STA-1 or STA-2. Furthermore, STA-1 and STA-2 are separated by more than the minimum distance Dmin.

Figure 6:
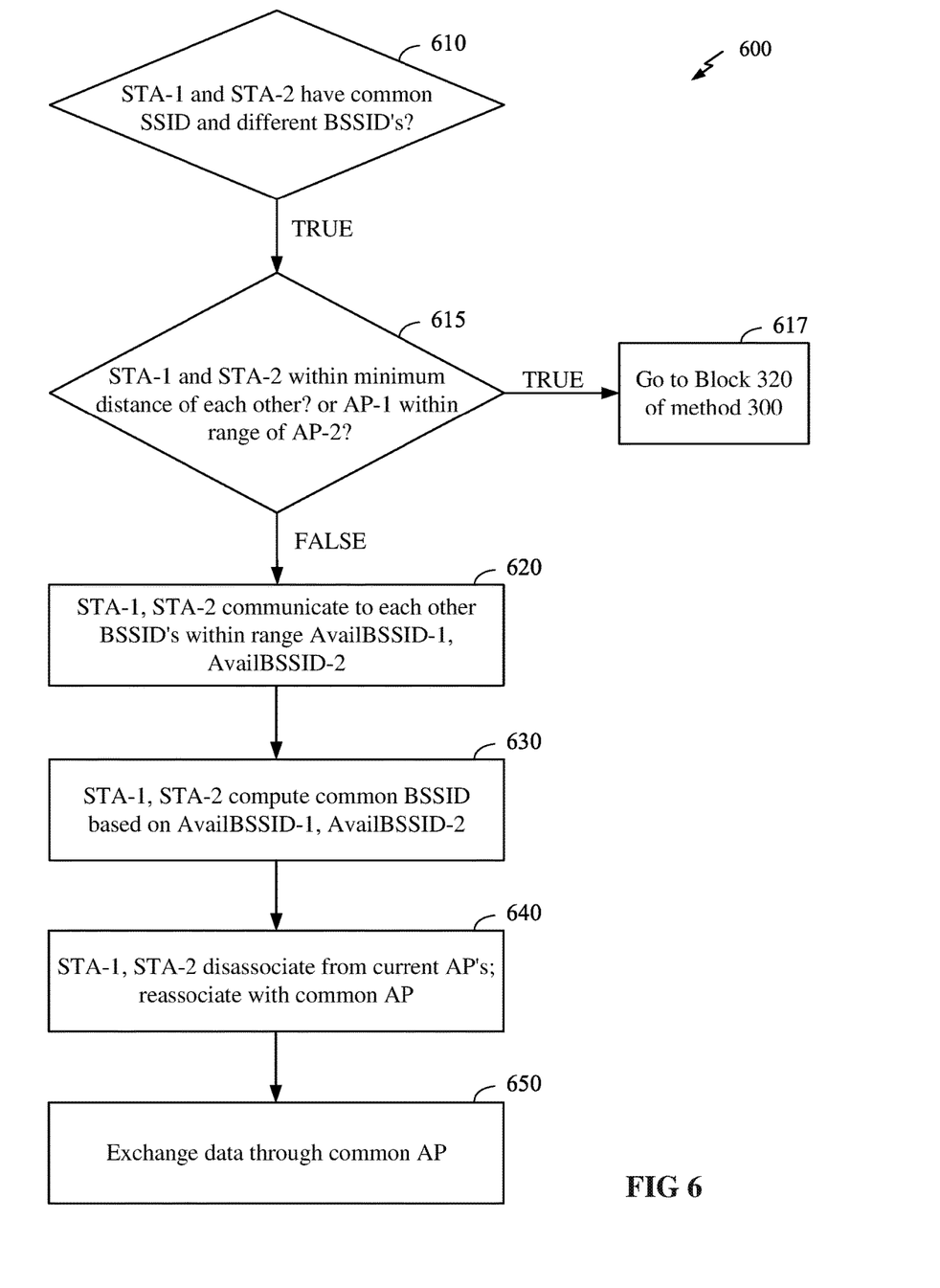
FIG. 6 illustrates an alternative exemplary implementation of a method for associating the paired STA's with a third AP functioning as the common AP.

FIG. 6 illustrates an alternative exemplary implementation 600 of a method for associating the paired STA's with a third AP functioning as the common AP.

In FIG. 6, at block 610, for paired STA's STA-1 and STA-2, it is determined whether they share a common SSID but different BSSID's. For example, this may correspond to WLAN configuration 500 illustrated in FIG. 5, wherein STA-1 and STA-2 are both associated with SSID-2, but STA-1 is associated with BSSID=1 and STA-2 is associated with BSSID=2. If the determination is TRUE, then method 600 proceeds to block 615.

At block 615, it is determined whether the paired STA's are within a minimum distance from each other, or whether a currently associated AP (e.g., AP-1) is within range of both the paired STA's. If this is TRUE, then method 600 proceeds to block 617 to execute block 320 of method 300, e.g., as described hereinabove with reference to FIG. 3. If FALSE, then method 600 proceeds to block 620. In particular, if the WLAN configuration is such that only one STA needs to disassociate and reassociate, then method 300 may be executed.

At block 620, paired STA's STA-1 and STA-2 communicate to each other a list of BSSID's within range of each STA. For10 example, AvailBSSID-1, AvailBSSID-2 may represent lists of BSSID's within range of STA-1, STA-2, respectively. In an exemplary implementation, each list may rank BSSID's in order of received signal strength, and/or may include indicators of the actual received signal strengths of each BSSID. The communications may be performed in a peer-to-peer manner, or over the wireless infrastructure.

At block 630, STA-1 and STA-2 compute a common BSSID based on the received lists AvailBSSID-1, AvailBSSID-2. In an exemplary implementation, the paired STA's may independently agree on a common BSSID given the received lists AvailBSSID-1, AvailBSSID-2, i.e., without exchanging further information between themselves. For example, the common BSSID may be chosen to correspond to the AP received with the highest sum of received signal strengths (e.g., received signal strength at STA-1 plus received signal strength at STA-2, etc.) by both terminal stations, or using other joint metrics. One of ordinary skill in the art will appreciate that any of a variety of techniques may be employed to choose a common BSSID under these conditions, and such alternative exemplary implementations are contemplated to be within the scope of the present disclosure.

Figure 7:
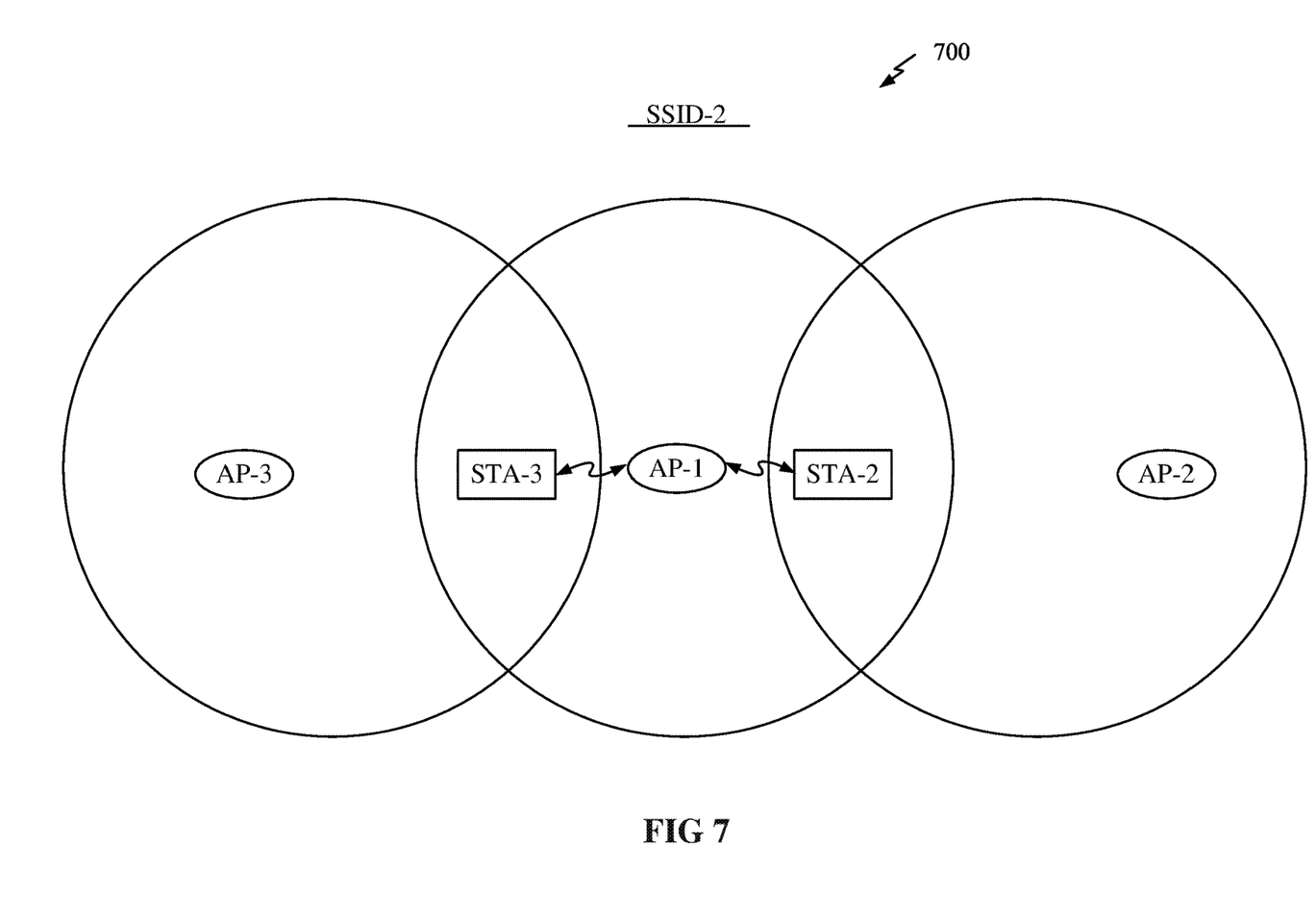
FIG. 7 shows an exemplary configuration of the WLAN following a certain stage of the method in FIG. 6.

At block 640, STA-1 and STA-2 disassociate from their current AP's, and reassociate with the common AP as computed at block 630. FIG. 7 shows an exemplary configuration 700 of the WLAN following block 640 of method 600. In particular, STA-1 and STA-2, having disassociated from their respective previous AP's AP-1 and AP2, are both reassociated with the common AP AP-3.

At block 650, data is exchanged between the paired STA's through the common AP.

Figure 8:
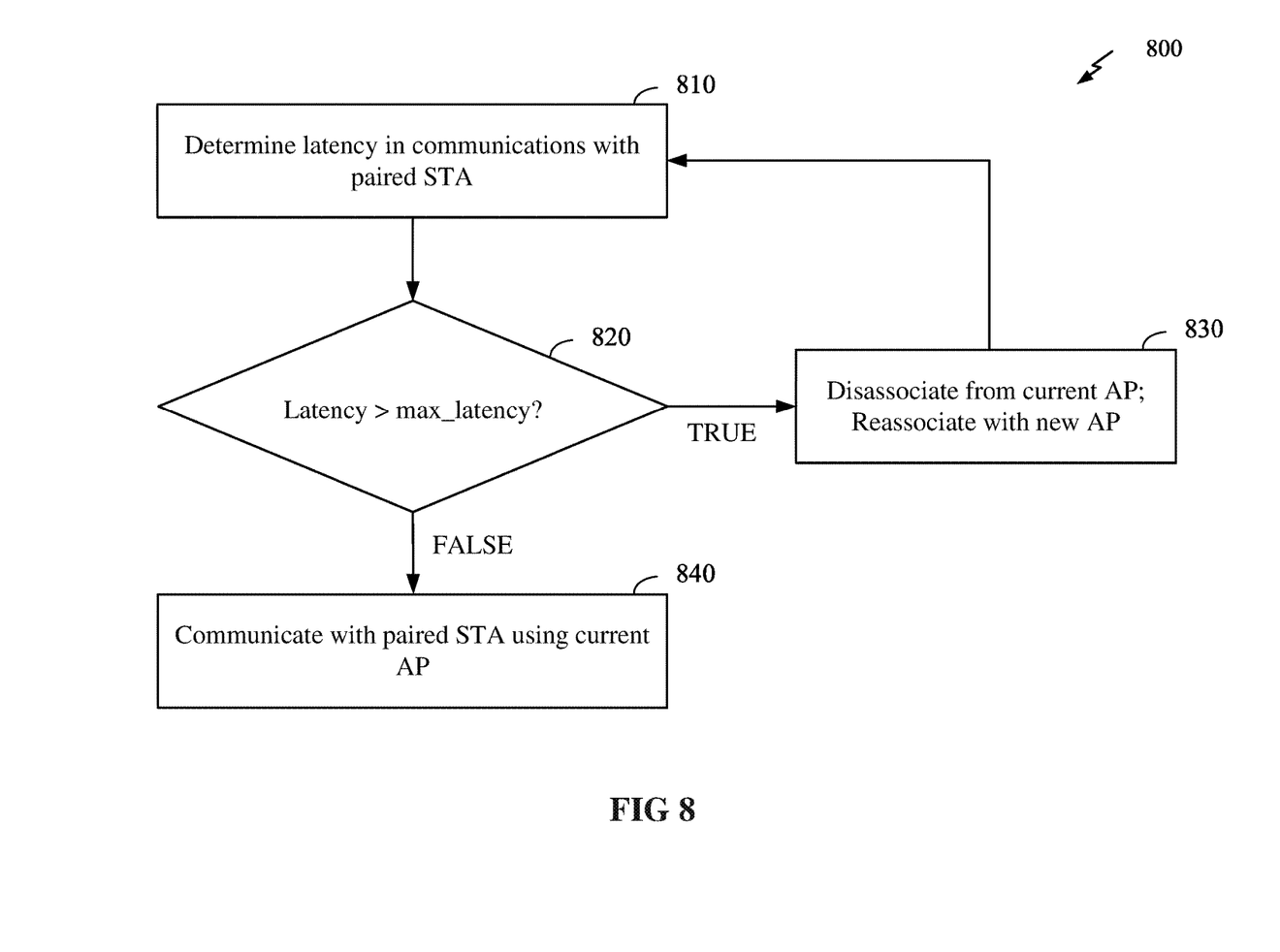
FIG. 8 illustrates an alternative exemplary implementation of a method according to the present disclosure.

FIG. 8 illustrates an alternative exemplary implementation of a method 800, wherein the determination at block 310 of FIG. 3 is omitted. In particular, an STA that disassociates and reassociates (herein "roaming STA") need not know the BSSID of the other paired STA prior to reassociation, and may simply repeat the process of disassociation and reassociation with various AP's within range until a connection of sufficiently low latency with the other paired STA is established.

In FIG. 8, at block 810, an STA determines the latency in communications with a paired STA. One of ordinary skill in the art will appreciate that such determination may be made using various techniques, e.g., comparing a timestamp of a transmitted data packet with the current time, etc.

At block 820, it is determined whether the measured latency at block 810 is greater than max_latency, or a maximum latency threshold deemed acceptable in the system. If FALSE, then method 800 proceeds to block 840, wherein ordinary communications are conducted between the paired STA's using the current AP. If TRUE, then method 800 proceeds to block 830.

At block 830, the roaming STA disassociates from the current AP, and reassociates with a new AP. In an exemplary implementation, the new AP may correspond to, e.g., an AP with which the roaming STA has not yet been associated during a current communications session with its paired STA. Following reassociation with a new AP, the method 800 proceeds back to block 810.

In an alternative exemplary implementation (not shown), method 800 may further include, prior to disassociating from the current AP, verifying that the second terminal station is within a minimum distance of the first terminal station.

It will be appreciated that, according to method 800, STA-2 (the roaming STA) may be caused to disassociate from AP-2 in configuration 100 of FIG. 1, and subsequently reassociate with AP-1. In this case, the roaming STA may reassociate with other AP's within range (not shown in FIG. 1), prior to establishing connection 420.2 with AP-1 that has low latency. Alternatively, in configuration 500 of FIG. 5, both STA-1 and STA-2 may simultaneously execute method 800, eventually resulting in both paired STA's reassociating with AP-3 for low-latency communications.

Figure 9:
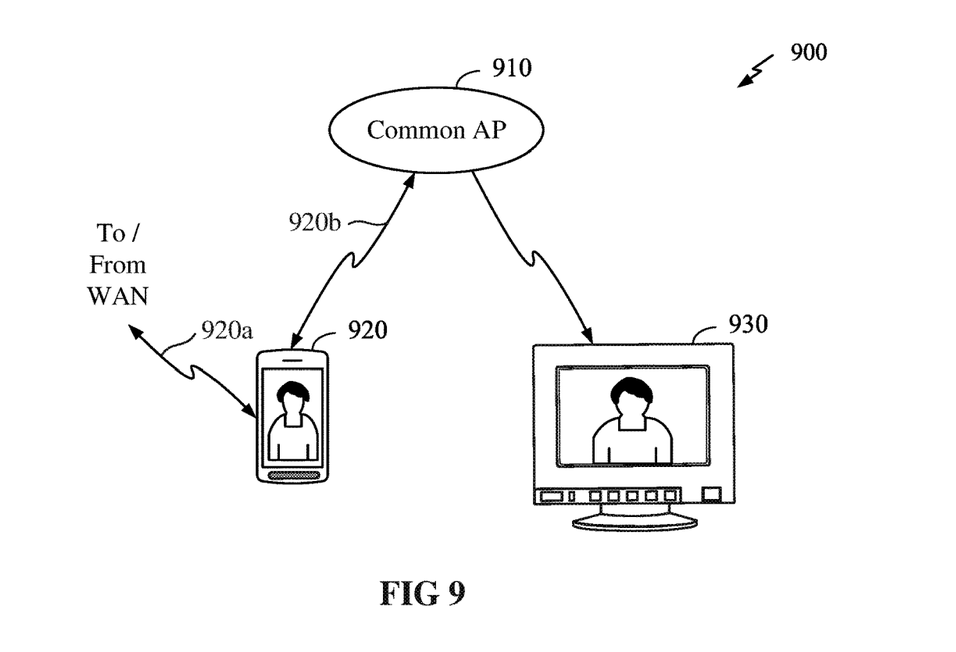
FIG. 9 illustrates an exemplary implementation of paired STA's associated with a common AP.

FIG. 9 illustrates an exemplary implementation 900 of paired STA's associated with a common AP 910, wherein STA-1 is a wireless content device 920, and STA-2 is a wireless display 930 configured to display content received from wireless content device 920. In an exemplary implementation, the paired STA's may be connected to common AP 910 as a result of, e.g., executing either method 300, method 600, or method 900. Note wireless content device 920 may support an alternative wireless connection 920a to a WAN (not shown), e.g., a 4G network, in addition to wireless connection 920b to AP 910.

Figure 10:
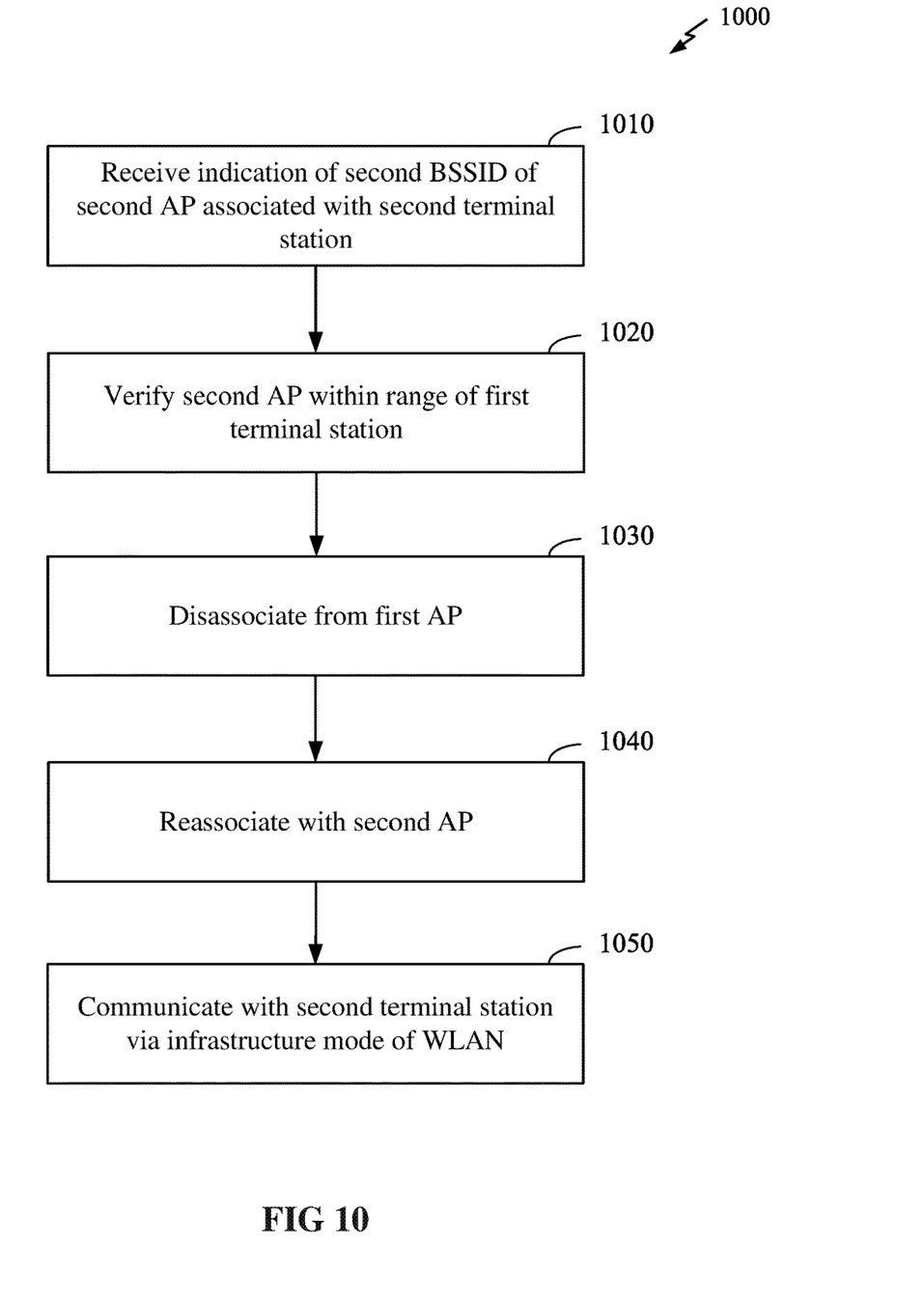
FIG. 10 illustrates an exemplary implementation of a method.

FIG. 10 illustrates a method 1000 for use by a first terminal station in a wireless local area network (WLAN), the method comprising: at block 1010, while being associated with a first access point (AP) of the WLAN having a first basic service set identity (BSSID), receiving an indication of a second BSSID of a second access point associated with a second terminal station in the WLAN; at block 1020, in response to determining the second BSSID being distinct from the first BSSID, verifying that the second AP is within range of the first terminal station; at block 1030, disassociating from the first AP; at block 1040, reassociating with the second AP; and at block 1050, communicating with the second terminal station via infrastructure mode of the WLAN.

Figure 11:
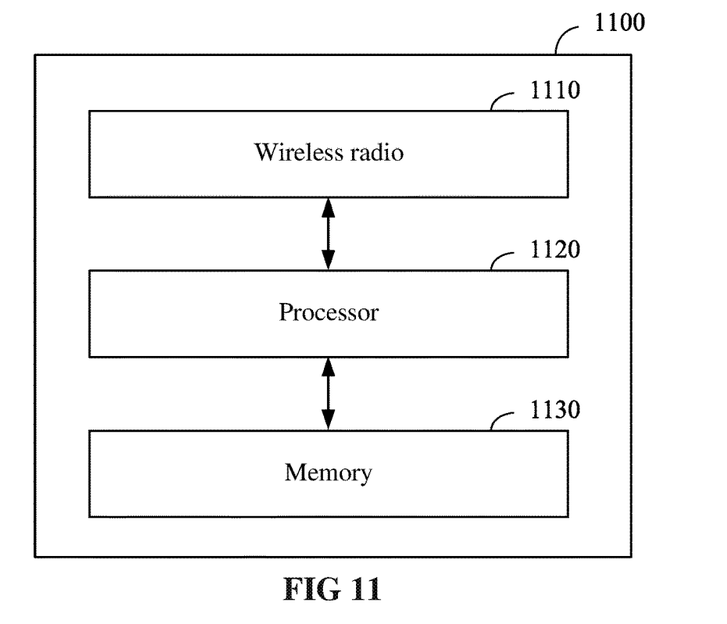
FIG. 11 illustrates an exemplary implementation of an apparatus.

FIG. 11 illustrates an apparatus 1100 comprising: a wireless radio 1110 comprising a receiver and a transmitter for wirelessly communicating with a wireless local area network (WLAN) as a first terminal station; a processor 1120 coupled to the wireless radio to generate data for the transmitter and to receive data from the receiver; a memory 1130 coupled to the processor, the memory storing instructions operable to cause the processor to execute steps comprising: while being associated with a first access point (AP) of the WLAN having a first basic service set identity (BSSID), receiving an indication of a second BSSID of a second access point associated with a second terminal station in the WLAN; in response to determining the second BSSID being distinct from the first BSSID, verifying that the second AP is within range of the first terminal station; disassociating from the first AP; and reassociating with the second AP; and using the wireless radio, communicating with the second AP via infrastructure mode of the WLAN.

Figure 12:
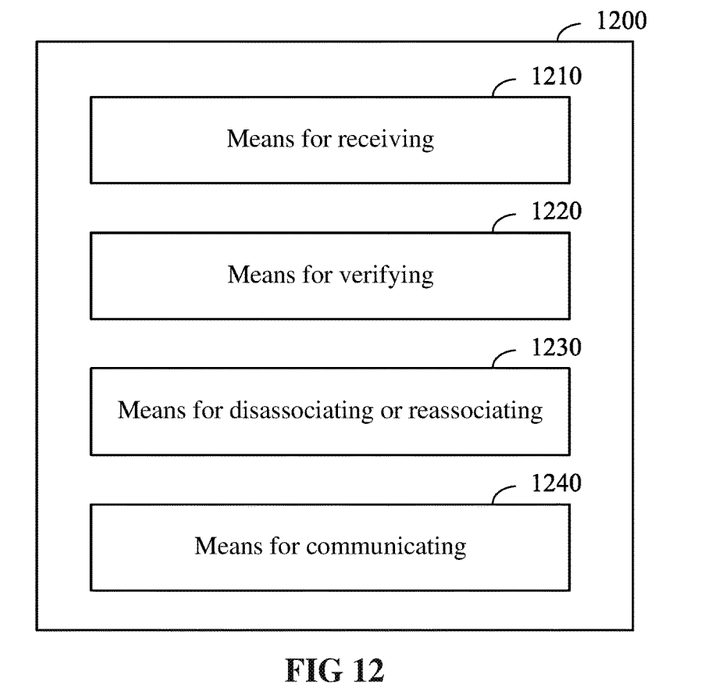
FIG. 12 illustrates an alternative exemplary implementation of an apparatus.

FIG. 12 illustrates an apparatus 1200 comprising: means 1210 for, while being associated with a first access point (AP) of the WLAN having a first basic service set identity (BSSID), receiving an indication of a second BSSID of a second access point associated with a second terminal station in the WLAN; means 1220 for, in response to determining the second BSSID being distinct from the first BSSID, verifying that the second AP is within range of the first terminal station; means 1230 for disassociating from the first AP and reassociating with the second AP; and means 1240 for communicating with the second AP via infrastructure mode of the WLAN. In an exemplary implementation, such means may correspond to, e.g., any hardware or software logical modules configured to perform the functions recited.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. A method for use by a first terminal station in a wireless local area network (WLAN), the method comprising:
   while being associated with a first access point (AP) of the WLAN having a first basic service set identity (BSSID), receiving an indication of a second BSSID of a second access point associated with a second terminal station in the WLAN;
   in response to determining the second BSSID being distinct from the first BSSID, verifying that the second AP is within range of the first terminal station;
   disassociating from the first AP;
   reassociating with the second AP; and
   communicating with the second terminal station via infrastructure mode of the WLAN.

2. The method of claim 1, the receiving the indication of the second BSSID comprising wirelessly receiving a broadcast message from the second terminal station.

3. The method of claim 1, the receiving the indication of the second BSSID comprising receiving a broadcast message from the second terminal station through the first AP.

4. The method of claim 1, further comprising:
   in response to the second BSSID being the same as the first BSSID, foregoing the disassociating and the reassociating.

5. The method of claim 1, the verifying comprising:
   receiving an indication of a location of the second terminal station; and
   determining the location of the second terminal station to be within a minimum distance of the location of the first terminal station.

6. The method of claim 5, the receiving the indication of the second BSSID and the indication of the location of the second terminal station comprising receiving a single broadcast packet from the second terminal station containing the second B S SID and the location of the second terminal station.

7. The method of claim 1, further comprising:
   after disassociating from the first AP, preventing the first terminal station from reassociating with the first AP.

8. The method of claim 1, the receiving the indication comprising receiving a list of BSSID's within range of the second terminal station, the verifying comprising selecting a BSSID from said list that is also within range of the first terminal station.

9. The method of claim 8, further comprising wirelessly broadcasting a list of BSSID's within range of the first terminal station.

10. The method of claim 8, the selecting the BSSID comprising selecting a BSSID that maximizes the sum of the received signal power at the first terminal station and the received signal power at the second terminal station.

11. An apparatus comprising:
    a wireless radio comprising a receiver and a transmitter for wirelessly communicating with a wireless local area network (WLAN) as a first terminal station;

a processor coupled to the wireless radio to generate data for the transmitter and to receive data from the receiver;

a memory coupled to the processor, the memory storing instructions operable to cause the processor to execute steps comprising:

while being associated with a first access point (AP) of the WLAN having a first basic service set identity (BSSID), receiving an indication of a second BSSID of a second access point associated with a second terminal station in the WLAN;

in response to determining the second BSSID being distinct from the first BSSID, verifying that the second AP is within range of the first terminal station;

disassociating from the first AP; and reassociating with the second AP;

using the wireless radio, communicating with the second terminal station via infrastructure mode of the WLAN.

12. The apparatus of claim 11, the receiving the indication of the second BSSID comprising wirelessly receiving a broadcast message from the second terminal station.

13. The apparatus of claim 11, the receiving the indication of the second BSSID comprising receiving a broadcast message from the second terminal station through the first AP.

14. The apparatus of claim 11, further comprising:

in response to the second BSSID being the same as the first BSSID, foregoing the disassociating and the reassociating.

15. The apparatus of claim 11, the verifying comprising:

receiving an indication of a location of the second terminal station; and determining the location of the second terminal station to be within a minimum distance of the location of the first terminal station.

16. The apparatus of claim 15, the receiving the indication of the second BSSID and the indication of the location of the second terminal station comprising receiving a single broadcast packet from the second terminal station containing the second B S SID and the location of the second terminal station.

17. The apparatus of claim 11, further comprising:

after disassociating from the first AP, preventing the first terminal station from reassociating with the first AP.

18. The apparatus of claim 11, the receiving the indication comprising receiving a list of BSSID's within range of the second terminal station, the verifying comprising selecting a BSSID from said list that is also within range of the first terminal station.

19. A system comprising:

at least one memory storing executable instructions; and at least one processor, coupled to the at least one memory, that is configured to execute the executable instructions stored in the memory to:

while being associated with a first access point (AP) of the wireless local area network (WLAN) having a first basic service set identity (BSSID), receive an indication of a second BSSID of a second access point associated with a second terminal station in the WLAN;

in response to determining the second BSSID being distinct from the first BSSID, verify that the second AP is within range of a first terminal station;

disassociate from the first AP;

reassociate with the second AP; and communicate with the second terminal station via infrastructure mode of the WLAN.

20. The system of claim 19, wherein the processor is further configured to, prior to dissociating from the first AP, verify that the second terminal station is within a minimum distance of the first terminal station.

* * * * *